Figure 1:
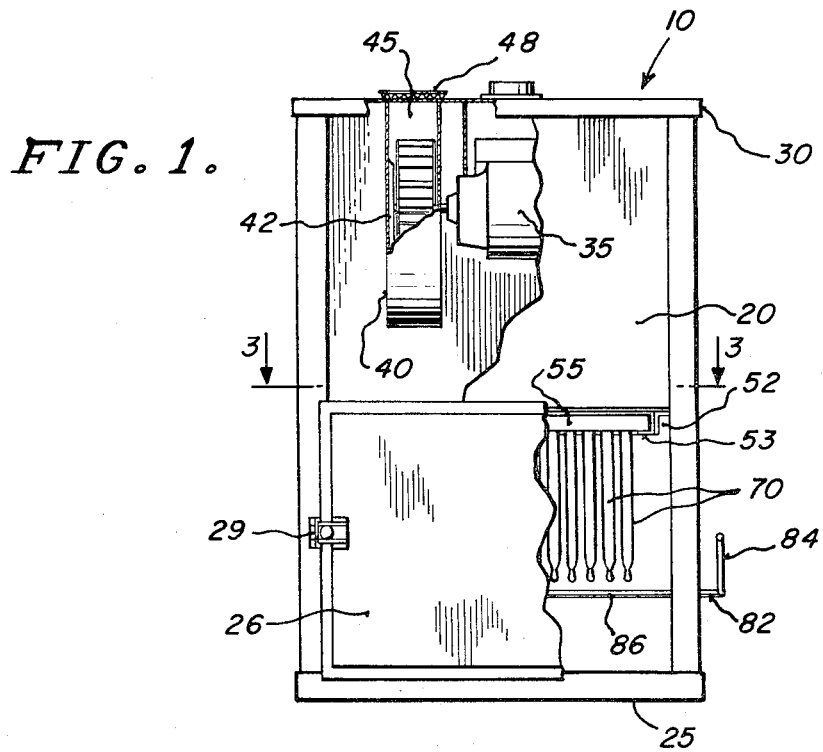

United States Patent [19]
Pierce

[11] 3,733,790
[45] May 22, 1973

[54] FILTERING APPARATUS

[75] Inventor: Leo A. Pierce, St. Paul, Minn.

[73] Assignee: The Torit Corporation, St. Paul, Minn.

[22] Filed: Feb. 11, 1971

[21] Appl. No.: 114,537

[52] U.S. Cl. .................55/324, 55/334, 55/483, 55/484, 55/511
[51] Int. Cl. ............................B01d 49/00
[58] Field of Search.............55/341, 467, 483, 55/484, 305, 511, DIG. 26, 31, 324, 334

[56] References Cited

UNITED STATES PATENTS

| 3,475,884 | 11/1969 | Kulzer | 55/341 |
| 3,295,298 | 1/1967 | Mackey | 55/470 X |
| 3,395,519 | 8/1968 | Kleissler | 55/341 X |

Primary Examiner—Tim R. Miles
Assistant Examiner—William Cuchlinski, Jr.
Attorney—Schroeder, Siegfried & Ryan

[57] ABSTRACT

A filtering apparatus incorporating an enclosure having a motor blower mounted on a removable top cover of the same and a bag type filter section in which the number of bag type filters may be increased or decreased to increase or decrease the filtering capacity of the apparatus.

3 Claims, 4 Drawing Figures

PATENTED MAY 22 1973

3,733,790

SHEET 1 OF 2

INVENTOR
Leo A. Pierce
BY
Schroeder Siegfried & Ryan
ATTORNEYS

FIG. 3.
FIG. 4.
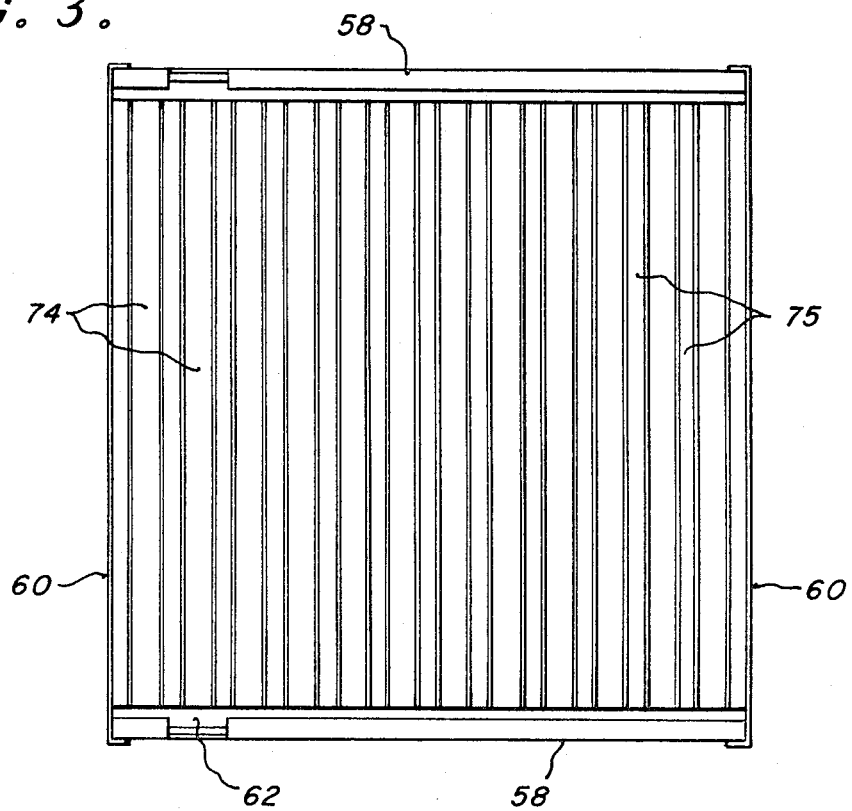
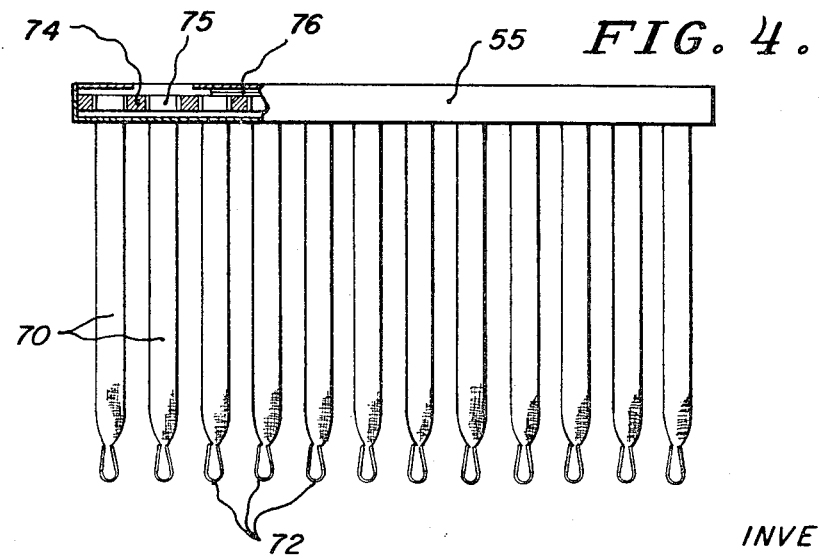
INVENTOR
Leo A. Pierce
BY
Schroeder Siegfried & Ryan
ATTORNEYS

FILTERING APPARATUS

My invention relates to a filtering apparatus and more particularly to an improved filtering apparatus in which the number of filter elements therein may be readily changed to vary the filtering capacity of the unit.

A filtering apparatus may take a variety of forms depending upon the application of the same. The subject invention is directed to an enclosed type filtering apparatus having a blower incorporated therewith which is adapted to receive contaminated air from a room or area through a duct work and pass the same through cloth type filters through the operation of the blower discharging the cleaned air back into the area from which the unfiltered air was taken. Such filtering apparatus is well known and the present invention is directed to an improved low cost filtering apparatus of this type in which the number of filtering elements may be readily changed, the filtering section may be removed for servicing and in which the bag type filters may be shaken for cleaning the same. The improved filtering apparatus incorporates an enclosure having a baffle therein dividing the input and output sections with an inlet opening to the same. A blower is positioned in the opposite or discharge section of the enclosure to provide for circularization of air therethrough. Positioned between the inlet and blower is a filter section in the form of a frame mounting a plurality of bag type filters which filters are positioned in a side-by-side relationship and suspended from the frame. The structure incorporates spacer means between the bags to seal and separate the same. The bag type filters are closed at one extremity and the mounting frame includes provisions for readily adding to or removing filter bags therefrom. This improved structure incorporates the mounting of the blower and motor assembly on the removable top of the casing and a suitable shaker means connected to the closed extremities of the bag type filters for cleaning the same.

Therefore it is the principal object of this invention to provide an improved low cost filtering apparatus.

Another object of this invention is to provide a low cost filtering apparatus in which the number of filter elements therein may be readily changed to vary the filtering capacity of the apparatus.

A further object of this invention is to provide a filtering apparatus of this type which is easily serviced and maintained.

Figure 2:
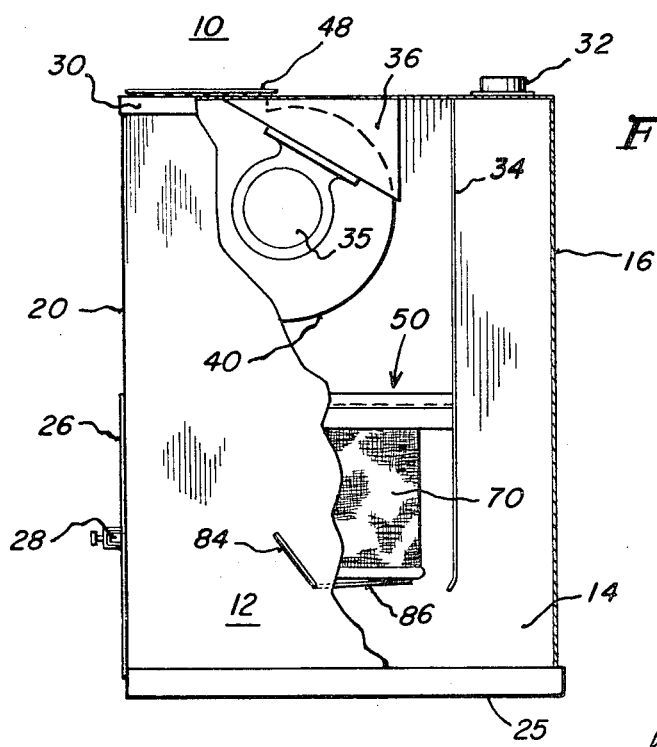

These and other objects of this invention will become apparent from a reading of the attached description together with the drawings wherein:

FIG. 1 is a front elevation view of the filtering apparatus with parts broken away, FIG. 2 is a side elevation view of the apparatus of FIG. 1 with parts broken away, FIG. 3 is a sectional view of the apparatus of FIG. 1 taken along the lines 3—3 therein, and FIG. 4 is a side elevation view of the apparatus of FIG. 3.

My improved filtering apparatus is shown in FIGS. 1 and 2 generally at 10. It incorporates an enclosure formed by side walls 12, 14, a rear wall 16 and a front wall 20, all preferably made of sheet metal which mount on a closed base section 25 to form a generally rectangular closed structure. The front wall includes a removable door panel 26 having suitable latching means 28 thereon fitting into cooperating latch parts 29 on the front wall to secure the same thereon. At the top of the enclosure is a removable top cover member 30 having an inlet passage or port 32 at the top rear portion of the same. Within the enclosure is a sheet metal baffle 34 which extends between the side walls 12 and 14 and is spaced from the rear wall 16 extending from the upper edge of the walls and toward the lower edge and terminating short of the base member 25 to provide a passage at the rear of the enclosure through which unfiltered air is directed to the interior of the enclosure. The wall, and base parts of the enclosure are suitably connected by screws or welding to form an airtight structure. Positioned on the top cover member is a motor 35 mounted on a depending flange 36 attached to the cover member with the motor being connected to a blower 40 having an inlet passage 42 at one side of the same and an outlet passage 45 in the cover member which is covered by an appropriate grill 48.

Positioned within the enclosure and to the side of the baffle remote from the inlet aperture and beneath the motor and blower attached to the cover is a filter section, indicated generally at 50. The filter section is mounted on flange members 52 which are suitably attached to the side walls 12 and 14 of the enclosure through means such as welding, the flange structure having a channel shaped guide portion 53 in which the filter frame is mounted. The filter frame 55 will best be seen in FIGS. 3 and 4 as including channel shaped side frame members 58 and strap type end members 60 suitably connected thereto to form a generally rectangular structure. Positioned in the top of the channel shaped side members 58 are slots 62 through which filter elements are inserted and removed, as will be hereinafter noted. The filter elements are indicated at 70 as including a plurality of bag type elements closed at the mounted extremity as by clip 72 and having a mounting bracket 74 at the opposite extremity which are held within and between the channel shaped frame sides 58 of the filter frame. These are inserted through the slot 62 in the upper part of the frame and are spaced apart by block type spacer members 75 such that an airtight seal is obtained between the individual filter elements. Suitable stripping 76 is positioned on top of the spacers and filter mounting ends 74 to secure the filter bag elements in the frame in an airtight and motion tight arrangement. The number of filter elements may be varied by reducing or increasing the size and number of the spacers to vary the capacity of the filter. The filter is mounted in the enclosure in the channel shaped frame part 53 of the flange section 52 to slide therein filling the area within the enclosure defined by the door or front wall, the side walls and the baffle section. The filter elements are substantially the same width dimension as the distance between the front of the enclosure and the baffle section and are mounted in spaced parallel relationship to define a continuous filter surface through which inlet or unfiltered air flow must pass to be drawn by the blower into the inlet of the same and discharges through the outlet 45 thereof with operation of the motor 35.

A manual agitator or shaker in the form of a generally rectangular frame 86 or rack is pivotally mounted between the side walls 12 and 14 of the enclosure on an appropriate shaft 82 which extends out of one side of the enclosure and mounts a handle section 84 on the extremity of the same. By oscilating the handle, the shaft is oscilated to oscilate the frame 86 or rack engaging the end sections of the bag type filters at the edges of the same to shake the bag filters to remove excess dirt from the outer surface of the same. This will be deposited in the base of the enclosure and may be removed by removal of the door 26 to obtain access thereto.

The improved filtering apparatus provides a low cost filter in which the filtering capacity of the same may be readily changed by inserting or increasing or decreasing the number of bag type filters included in the filter section thereof. These are readily inserted into the filter mounting frame through the recesses 62 in the same and by changing the number of filter bags and the number and size of the spacer members positioned therebetween the filtering capacity is changed.

In the operation of the filtering apparatus, energization of the motor will cause air flow through the inlet in the removable top enclosure 32 to one side of the enclosure defined by the baffle divider 35 and the rear wall 16. This air flow will be directed around the end of the baffle and through the filter section being drawn out of the enclosure by the blower which discharges filtered air at the grill or outlet extremity of the top cover. The top cover which mounts the motor and blower is removable for access to the motor for maintenance purposes. Dirt is removed from the filter section by agitating the same through operation of the handles 35 on the shaker causing the frame 86 or rack to engage the edges of the filters shaking the same. Dust and dirt deposited on the surface of the filter will be shaken therefrom and allowed to drop to the base of the enclosure wherein it may be removed manually by access through the door section of the enclosure.

In considering this invention it should be remembered that the present disclosure is illustrative only and the scope of the invention should be determined by the appended claims.

What is claimed is:

1. A filter assembly comprising, an enclosure having a door at one side thereof and a removable top cover, a baffle divider extending from said top cover parallel to one side of said enclosure and within said enclosure to a point spaced from the bottom of the enclosure remote from said door, an air inlet passage positioned through said cover and communicating with the portion of the casing to one side of said divider baffle, a motor driven blower mounted in the casing near the top thereof and to the other side of said dividing baffle within said enclosure, said blower including an outlet passage positioned in the top cover of the enclosure, and a removable filter section positioned within and across said enclosure to said other side of said divider baffle below said blower and adjacent said door therein, said filter section being formed of a plurality of filter bags closed at one extremity and having a mounting bracket at the other extremity with the width dimensions substantially equal to the width of the enclosure, said bag type filters being mounted in a generally rectangular frame which is channel-like in cross section with the bags being positioned in a side-by-side relationship and with spacer means of a length equal to the length of the mounting bracket of the bags and of uniform width dimension positioned between adjacent bags in the frame, and including slot means positioned in the top of the rectangular frame and on opposite sides thereof to permit insertion and removal of a variable number of filter bags and spacer members, said filter section being operative to filter air flow entering through said inlet passage and to one side of said divider baffle around the end of the same near the base of the enclosure and being exhausted by said blower through the outlet in said top cover.

2. The filter assembly of claim 1 in which the motor driven blower is mounted on the removable top cover of the enclosure.

3. The filter assembly of claim 1 and including rack means positioned below the filter section and mounting the closed extremities of the filter bags, and means including handle means positioned outside of the enclosure for oscillating the rack means to shake the filter bags.

* * * * *